(12) United States Patent
Schwake

(10) Patent No.: US 6,782,064 B1
(45) Date of Patent: Aug. 24, 2004

(54) CIRCUIT, ARCHITECTURE AND METHOD FOR ASYNCHRONOUS CLOCK DOMAIN SWITCHING

(75) Inventor: Steven J. Schwake, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/392,890

(22) Filed: Sep. 9, 1999

Related U.S. Application Data

(60) Provisional application No. 60/101,387, filed on Sep. 21, 1998.

(51) Int. Cl.[7] .................................................. H04L 7/00
(52) U.S. Cl. ....................................................... 375/354
(58) Field of Search ................................. 375/354, 370, 375/371

(56) References Cited

U.S. PATENT DOCUMENTS 5,675,615 A 10/1997 Watt ............................ 375/354
5,811,995 A * 9/1998 Roy et al. ..................... 327/99

* cited by examiner

*Primary Examiner*—Khai Tran
*Assistant Examiner*—Kevin M Burd
(74) *Attorney, Agent, or Firm*—Christopher P. Maiorana, P.C.

(57) ABSTRACT

A switch for at least two clock domains, comprising (a) first and second synchronizers in a first clock domain, (b) third and fourth synchronizers in a second clock domain, and (c) a state machine configured to interface with said synchronizers, thereby controlling switching between said first and second clock domains.

22 Claims, 6 Drawing Sheets

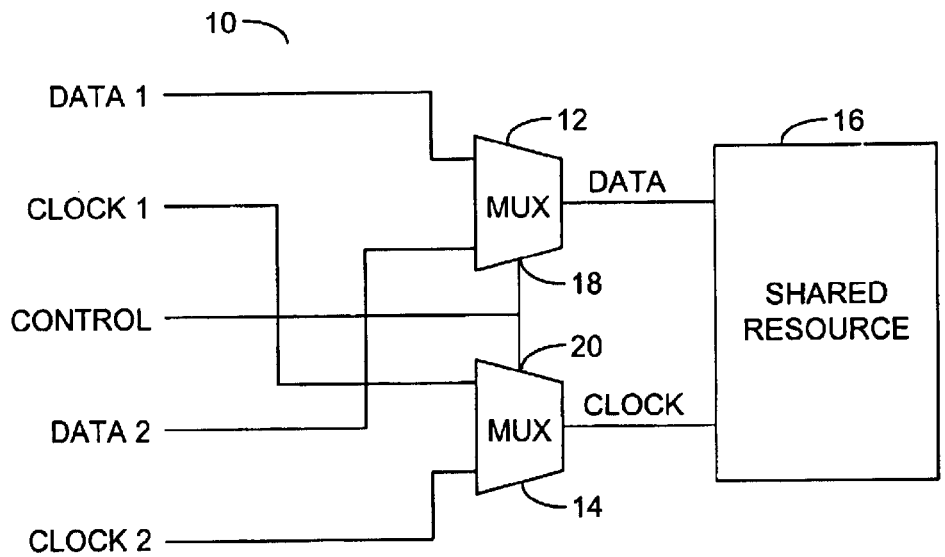
(CONVENTIONAL)
FIG. 1
MULTIPLEXED SWITCH
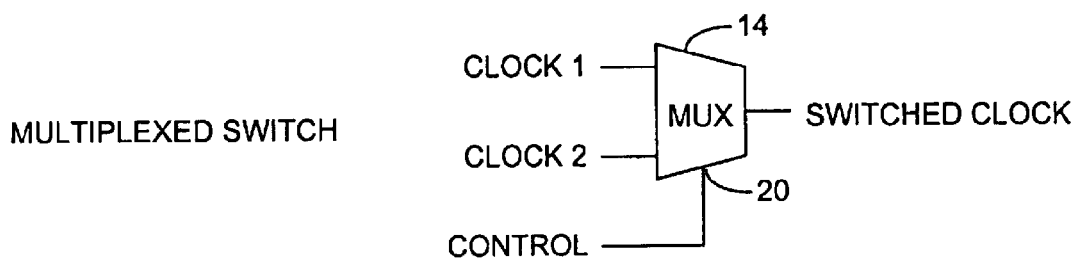
(CONVENTIONAL)
FIG. 2(A)

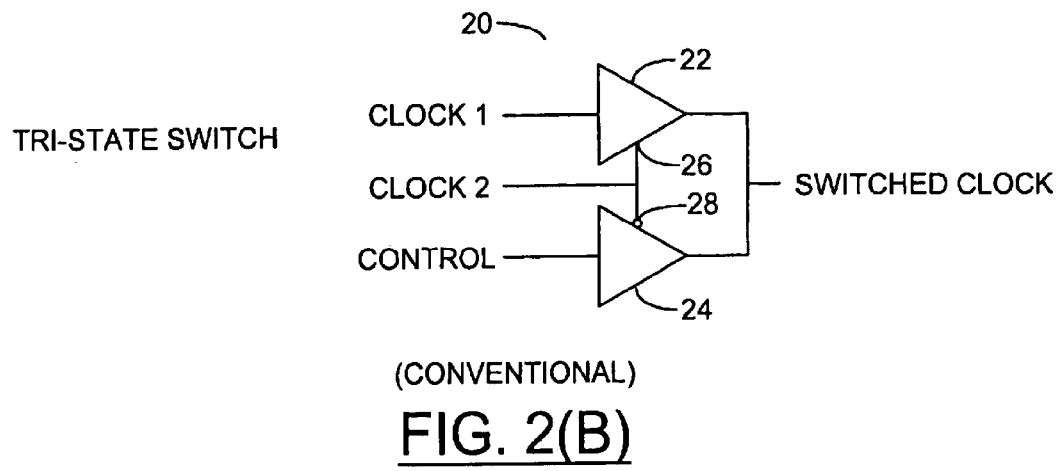
TRI-STATE SWITCH
(CONVENTIONAL)
FIG. 2(B)
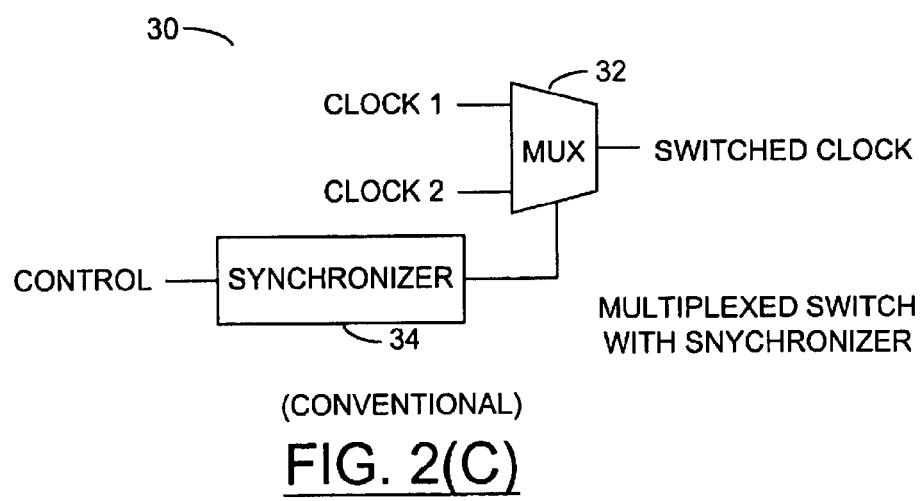
MULTIPLEXED SWITCH WITH SNYCHRONIZER
(CONVENTIONAL)
FIG. 2(C)

CIRCUIT, ARCHITECTURE AND METHOD FOR ASYNCHRONOUS CLOCK DOMAIN SWITCHING

This application claims the benefit of U.S. Provisional Application No. 60/101,387, filed Sep. 21, 1998, which is incorporated by reference in its entirety.

FIELD OF THE INVENTION

The present invention relates to a circuit, architecture and method for asynchronous switching between two clock domains, particularly between two asynchronous clock domains generally and, more particularly, to a circuit, architecture and method for asynchronous clock domain switching.

BACKGROUND OF THE INVENTION

Data synchronized between two asynchronous clock domains need access to a common resource. Asynchronous switching between asynchronous clocks can lead to truncated or short clock pulses and/or metastability problems.

Referring to FIG. 1, a conventional circuit 10 for asynchronous switching between two clock domains is shown. The circuit 10 comprises a multiplexer 12, a multiplexer 14, and a shared resource 16. A first data signal DATA 1 and a second data signal DATA 2 are received by the multiplexer 12. A first clock signal CLOCK 1 and a second clock signal CLOCK 2, which are not synchronized to each other, are received by the multiplexer 14. A control signal CONTROL is received by the multiplexer 12 at an input 18 and the multiplexer 14 at an input 20. The multiplexer 12 presents a data signal DATA to the shared resource 16. The multiplexer 12 presents the signal DATA in response to the signal DATA 1, the signal DATA 2 and the signal CONTROL. The multiplexer 14 presents a clock signal CLOCK to the shared resource 16. The multiplexer 14 presents the signal CLOCK in response to the signal CLOCK 1, the signal CLOCK 2 and the signal CONTROL.

The disadvantage of circuit 10 is incomplete clock pulses can be generated at indeterminate times. Such incomplete clock pulses result in metastability problems, particularly when the control signal is not synchronized to either or both of the clock signals CLOCK 1 and CLOCK 2 and/or the data signals DATA 1 and DATA 2.

In general, most designers shy away from switching clock circuits, such as the circuit 10. The designers would duplicate the multiplexers 12 and 14 as well as the shared resource 16 in FIG. 1 and switch back and forth on the side of the (no longer shared) resource 16 where the clock domains are the same. Thus, the clocks are synchronously switched in a single clock domain, rather than asynchronously switched across two clock domains.

A summary of asynchronous clock switching schemes is shown in FIGS. 2(A)–2(C). FIG. 2(A) shows a simplified diagram of the multiplexer 14 of FIG. 1. FIG. 2(B) shows a clock-switching circuit 20. The clock switching circuit 20 comprises a buffer 22 and a buffer 24. The buffer 22 receives a control signal CONTROL at an input 26. The buffer 24 receives the signal CONTROL at an input 28. The signal CONTROL tri-states one of the two buffers 22 or 24 to produce a selected clock signal SWITCHED CLOCK.

FIG. 2(C) shows an alternative clock switching circuit 30. The circuit 30 comprises a multiplexer 32 and a synchronizer 34. A control signal CONTROL is received by the synchronizer 34. The synchronizer 34 synchronizes to one of the two clock signals CLOCK 1 or CLOCK 2. In this case, the other clock signal CLOCK 1 or CLOCK 2 may, when initially selected, lead to the metastability problems described above.

SUMMARY OF THE INVENTION

The present invention concerns, in one aspect, a switch for at least two clock domains, comprising (a) first and second synchronizers in a first clock domain, (b) third and fourth synchronizers in a second clock domain, and (c) a state machine configured to interface with and/or receive signals from the synchronizers, thereby controlling switching between the first and second clock domains.

The present invention concerns, in a further aspect, a method of switching between first and second clock domains, comprising (a) driving a switch output at a logic level controlled by a first clock domain in response to a first control signal state, (b) driving the switch output at a first predetermined logic level for a predetermined period of time in response to (i) a second control signal state and (ii) either (A) a predetermined transition of both the first clock domain and a second clock domain, or (B) both the first and second clock domains having the first predetermined logic level and (c)enabling only the second clock domain to drive the switch output.

The objects, features and advantages of the present invention include providing one or more of the following new features and/or functions (a) asynchronous switching between two asynchronous clocks and (b) the switch architecture and circuitry composed of four synchronizers and an asynchronous state machine.

BRIEF DESCRIPTION OF THE DRAWINGS

These and other objects, features and advantages of the present invention will be apparent from the following detailed description and the appended claims and drawings in which:

FIG. 1 illustrates a conventional multiplexer-based scheme for clock and/or data signal switching for a shared resource.

FIGS. 2(A)–2(C) illustrate a summary of asynchronous clock switching schemes;

DETAILED DESCRIPTION OF THE PREFERRED EMBODIMENTS

Conventional switching techniques have been done with a control signal synchronized to one clock, or by simple multiplexing between two clocks. The present invention technique may asynchronously switch between two or more asynchronous clock domains.

Figure 3:
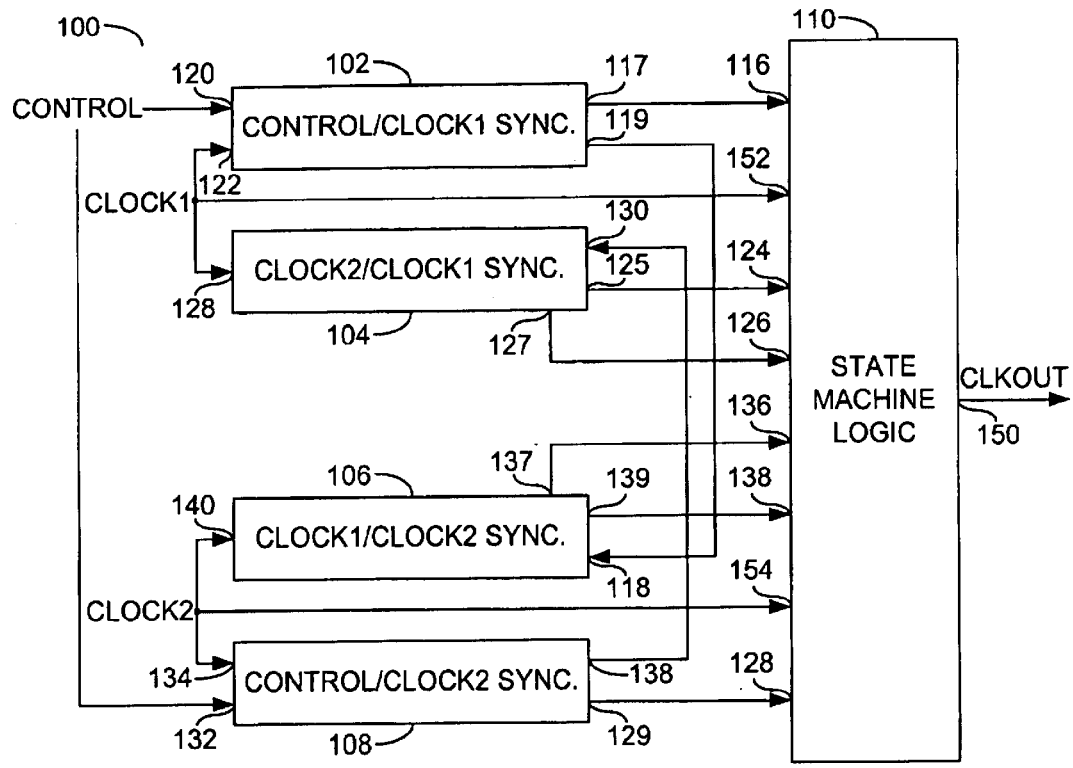
FIG. 3 is an exemplary embodiment of a circuit 100 suitable for use in the present invention.

Referring to FIG. 3, a circuit 100 is shown in accordance with a preferred embodiment of the invention. The circuit 100 generally comprises a control/clock1 synchronizer block (or circuit) 102, a clock2/clock1 synchronizer block (or circuit) 104, a clock1/clock2 synchronizer block (or circuit) 106, a control/clock2 synchronizer block (or circuit) 108 and a logic block (or circuit) 110. The circuit 100 may implement an alternative synthesis logic block (or circuit) 114 (to be described later in conjunction with FIGS. 5, 6, 7 and 8) to meet the design criteria of a particular implementation. In one example, the circuits 102, 104, 106 and 108 may be implemented as synchronizers. Furthermore, the circuit 100 may implement a number of synchronizers N, where N is an integer.

The control/clock1 synchronizer 102 and the control/clock2 synchronizer 108 may synchronize a control signal (e.g., CONTROL) of at least two of a plurality of asynchronous clock domains. The signal CONTROL may be configured to designate or select one of the signals (e.g., CLOCK1 or CLOCK2) as an active clock in the domain downstream from the synchronizers 102, 104, 106 and 108. The clock2/clock1 synchronizer 104 and the clock1/clock2 synchronizer 106 may synchronize signals from the at least two clock domains with each other. In addition to the four synchronizers 102, 104, 106 and 108, the logic circuit 110 may be configured to hold the clock signals in a particular or predetermined logic state for at least a clock cycle before enabling the new clock. The holding may prevent (or at least minimizes the risk of) any glitches during the switching operation.

The control/clock1 synchronizer 102 have an output 117 that may be connected to an input 116 of the logic circuit 110 and an output 119 that may be connected to an input 118 of the clock1/clock2 synchronizer 106. The control/clock1 102 may present signals at the outputs 117 and 119 in response to the signal CONTROL received at an input 120 and the signal CLOCK1 received at an input 122. The clock2/clock1 synchronizer 104 may have an output 125 and an output 127 that may be connected to an input 124 and an input 126 of the logic circuit 110, respectively. The clock2/clock1 synchronizer 104 may present signals at the outputs 125 and 127 in response to the signal CLOCK1 received at an input 128 and a signal received at the input 130 from the control/clock1 synchronizer 108, respectively.

The control/clock2 synchronizer 108 may have an output 129 that may be connected to an input 128 of the logic circuit 110 and an output 131 that may be connected to an input 130 of the clock2/clock1 synchronizer 104, respectively. The control/clock2 108 may present signals at the outputs 129 and 131 in response to the signal CONTROL received at an input 132 and the signal CLOCK2 received at an input 134. The clock1/clock2 synchronizer 106 may have an output 137 and an output 139 that may be connected to an input 136 and an input 138 of the logic circuit 110, respectively. The clock1/clock2 synchronizer 106 may present signals at the outputs 137 and 139 in response to the signal CLOCK2 received at an input 140 and the signal received at the input 118 from the control/clock1 synchronizer 102. The signal CONTROL may be asynchronous to any clock domain. The signal CONTROL, the signal CLOCK1 and/or the signal CLOCK2 may initiate a change in the circuit 100 when the signal CONTROL, the signal CLOCK1 and/or the signal CLOCK2 transition.

In one example, the logic circuit 110 may be implemented as an asynchronous state machine logic. However, other appropriate logic may be implemented in order to meet a criteria of a particular implementation. The state machine logic 110 may present a signal (e.g., CLKOUT) at an output 150. The state machine logic 110 may present the signal CLKOUT in response to the signal received at the input 116, the signal CLOCK1 received at an input 152, the signal received at the input 124, the signal received at the input 126, the signal CLOCK2 received at an input 154, the signal received at the input 136, the signal received at the input 138, and the signal received at input 128.

The state machine logic 110 may be configured to guarantee a self-completing clock. Overlap of the signal CLOCK1 or CLOCK2 with the signal CLOCK1 or CLOCK2 in a predetermined logic state may prevent switching transients. The synchronizers 102, 104, 106 and 108 may effectively minimize the risk of, or eliminate, metastability problems.

Figure 4:
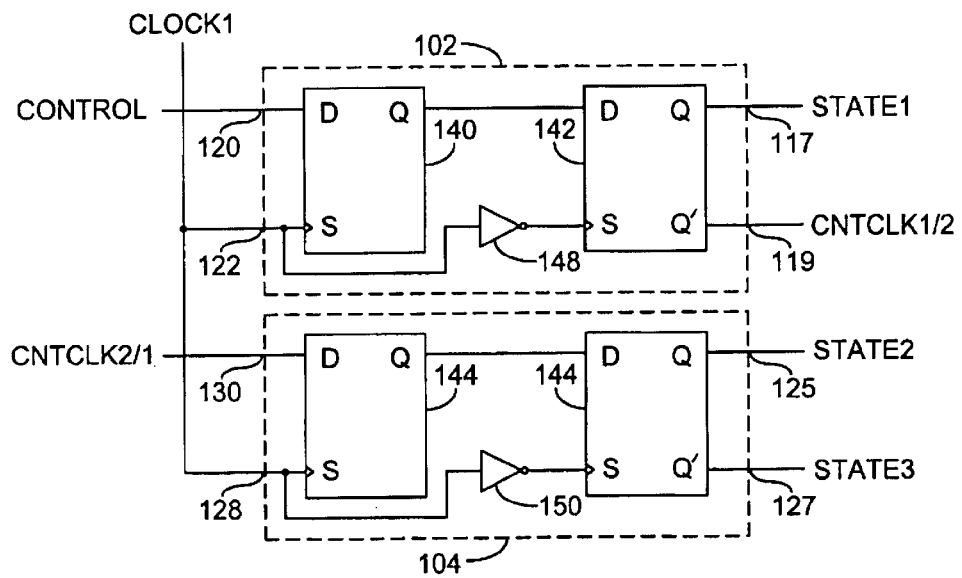
FIG. 4 illustrates an exemplary block diagram of the control/clock1 synchronizer 102 and the clock2/clock1 synchronizer 104 of FIG. 3.

Referring to FIG. 4 a detailed schematic of the control/clock1 synchronizer 102 and the clock2/clock1 synchronizer 104 of FIG. 3 are shown. The control/clock1 synchronizer 102 may generate a signal (e.g., STATE1) at the output 117 and a control signal (e.g., CNTCLK1/2) at the output 119. The control/clock1 synchronizer 102 may generate the signal STATE1 and the signal CNTCLK1/2 in response to the signal CONTROL received at the input 120 and the signal CLOCK1 received at the input 122.

The clock2/clock1 synchronizer 104 may generate a signal (e.g., STATE2) at the output 125 and a signal (e.g., STATE3) at the output 127. The clock2/clock1 synchronizer 104 may generate the signal STATE2 and the signal STATE3 in response to the signal CLOCK1 received at the input 128 and a control signal (e.g., CNTCLK2/1) received at an input 130 from the control/clock2 synchronizer 108.

The control/clock1 synchronizer 102 generally comprises a flip-flop 140 and a flip-flop 142. The clock2/clock1 synchronizer 104 generally comprises a flip-flop 144 and a flip-flop 146. The flip-flops 140, 142, 144 and 146 may, in one example, be implemented as "D" type flip-flops. An inverter 148 may be connected between the signal CLOCK1 and the flip-flop 142. An inverter 150 may be connected between the signal CLOCK1 and the flip-flop 146. The inverters 148 and 150 may be optional components that may be omitted. Preferably, however, the inverters 148 and 150 are present to ensure the signal CLOCK1 is in a predetermined state (e.g., a "low" state). When the inverters 148 and 150 are present, the propagation time is one rising and one falling edge of the signal CLOCK1 (shown in FIG. 9), as opposed to two rising or two falling edges of the signal CLOCK1 in the absence of the inverters 148 and 150.

The flip-flop 140 may connect to an input D of the flip-flop 142 from an output Q. The flip-flop 140 may generate a first synchronized signal at the output Q. The flip-flop 140 may generate the first synchronized signal in response to the signal CONTROL received at an input D and the signal CLOCK1 received at an input S. The flip-flop 142 may present the signal STATE1 at an output Q and the control signal CNTCLK1/2 at an output Q'. The flip-flop 142 may generate the signal STATE1 and the signal CNTCLK1/2 in response to the first synchronized signal received at the input D and the signal CLOCK1 received at an input S. The signal CLOCK1 may pass through the inverter 148.

The control/clock2 synchronizer 108 and the clock1/clock2 synchronizer 106 of FIG. 3 may operate and/or have components similar to the control/clock1 synchronizer 102 and the clock2/clock1 synchronizer 104, and will only be discussed in brief. The control/clock2 synchronizer 108 may generate a signal (e.g., STATE4) at the output 129 and the signal CNTCLK2/1 at the output 131, in response to the signal CONTROL received at the input 132 and the signal CLOCK2 received at the input 134 (not shown). The clock1/clock2 synchronizer 106 may generate a signal (e.g., STATE5) at the output 137 and a signal (e.g., STATE6) at the output 139, in response to the signal CLOCK2 received at the input 140 and the signal CNTCLK2/1 received at an input 118 (not shown).

The flip-flops of the control/clock2 synchronizer 108 may present the signal STATE4 and the signal CNTCLK2/1 in response to the signal CONTROL and the signal CLOCK2. The flip-flops of the clock1/clock2 synchronizer 106 may present the signal STATE5 and the signal STATE6 in response to the signal CNTCLK1/2 and the signal CLOCK2.

Figure 5:
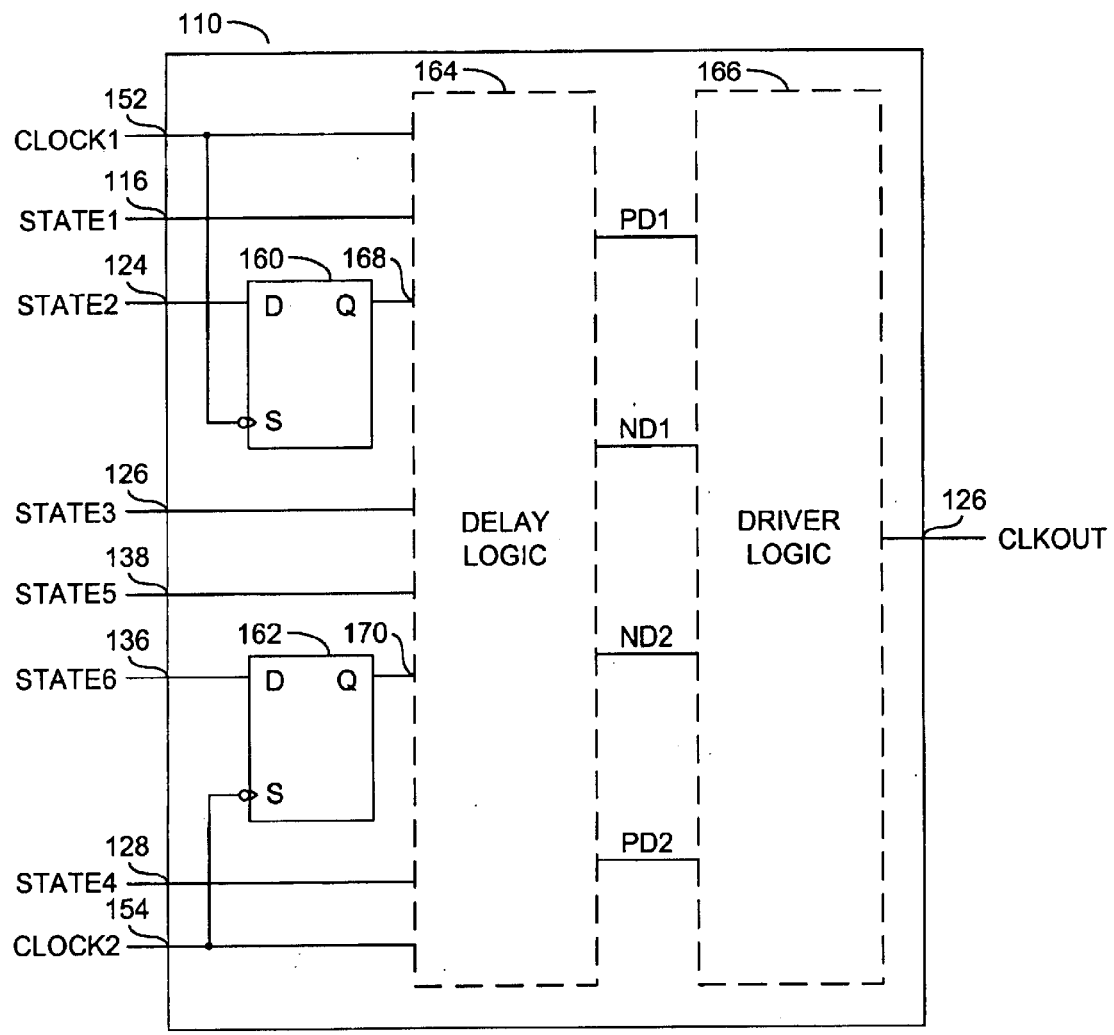
FIG. 5 illustrates an exemplary block suitable for the state machine logic 110 of FIG. 3.

Referring to FIG. 5, an exemplary block diagram of the state machine logic 110 is shown. The state machine logic 110 may be configured to arbitrate control of a switch output bus (not shown). The state machine logic 110 may (i) request control of the switch output bus for a particular clock CLOCK1 or CLOCK2, (ii) wait for the clock having control of the switch output bus to acknowledge the request, and (iii) grant control of the switch output bus to the requesting clock.

The state machine logic 110 may comprise a flip-flop 160, a flip-flop 162, a logic block (or circuit) 164, and a logic block (or circuit) 166. Alternatively, the synthesis logic 114 may be implemented in place of the logic circuit 166. In one example, the logic circuit 164 may be implemented as a delay logic circuit and the logic circuit 166 may be implemented as a driver logic circuit. However other appropriate logic circuits may be implemented in order to meet the design criteria of a particular implementation. The state machine logic 110 may generate the signal CLKOUT. The state machine logic 110 may receive the signal CLOCK1 at the input 152, the signal STATE1 at the input 116, the signal STATE2 at the input 124, the signal STATE3 at the input 126, the signal STATE4 at the input 128, the signal STATE5 at the input 136, the signal STATE6 at the input 138, and the signal CLOCK2 at the input 154.

The signals received by the state machine logic 110 from the synchronizers 102, 104, 106 and 108 may represent data, a periodic signal, or some combination of periodic and data signals. The synchronizers 102, 104, 106 and 108 may be configured to control the state machine logic 110 since the state machine logic 110 responds to outputs from the synchronizers 102, 104, 106 and 108.

The flip-flop 160 may present a signal at an output Q (e.g., STATE2' shown in FIG. 6) to an input 168 of the delay logic 164. The flip-flop 160 may present the signal STATE2' in response to the signal STATE2 received at an input D and the signal CLOCK1 received at an input S. The flip-flop 162 may present a signal at an output Q (e.g., STATE6' shown in FIG. 6) to an input 170 of the delay logic 164. The flip-flop 162 may present the signal STATE6' in response to the signal STATE6 received at an input D and the signal CLOCK2 received at an input S.

The delay logic circuit 164 may present a logic signal (e.g., PD1), a logic signal (e.g., PD2), a logic signal (e.g., ND1) and a logic signal (e.g., ND2) to the driver logic circuit 166. The driver logic circuit 166 may present the signal CLKOUT in response to the signal PD1, the signal PD2, the signal ND1 and the signal ND2.

Figures 6, 7:
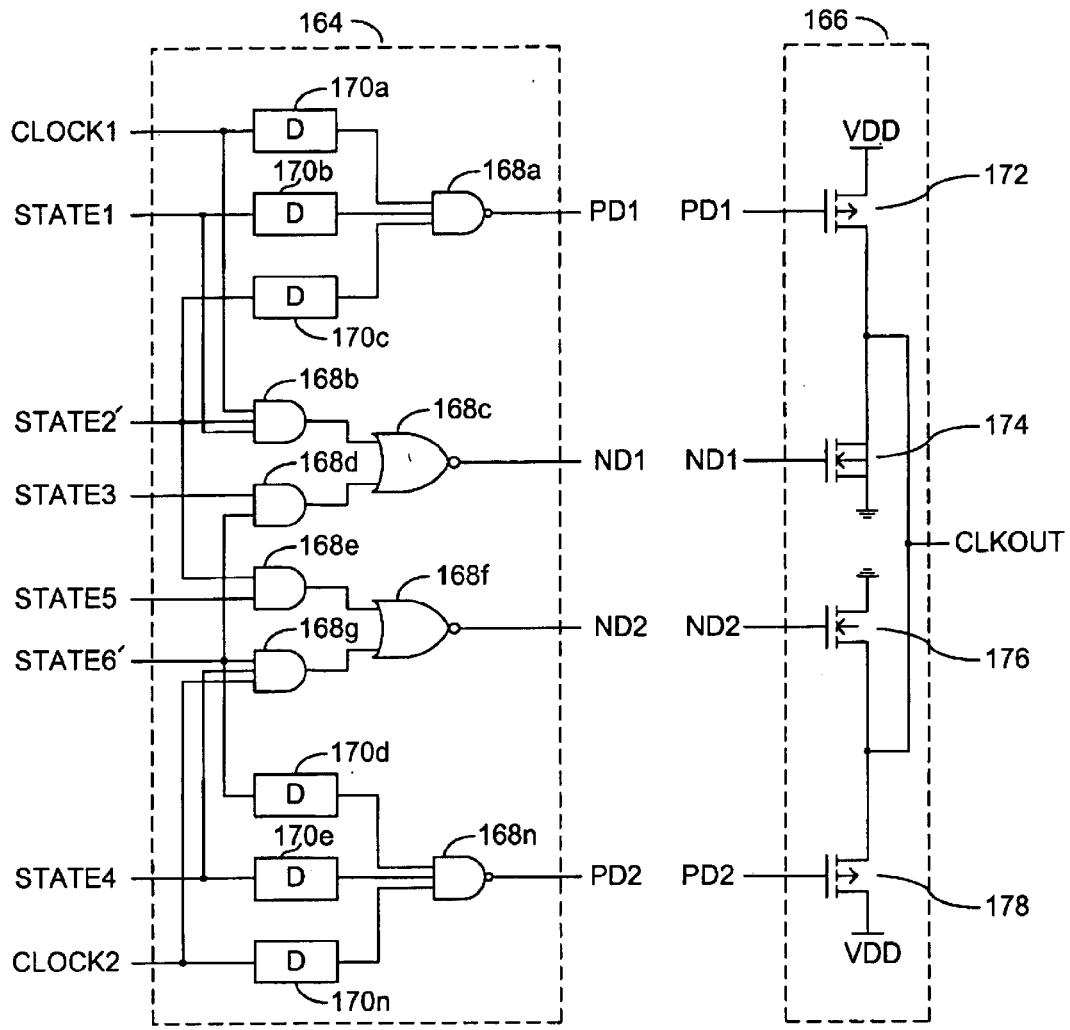
FIG. 6 illustrates an exemplary circuitry suitable for the delay logic 164 of FIG. 5.
FIG. 7 illustrates an exemplary circuitry suitable for the driver logic 166 of FIG. 5.

Referring to FIG. 6, exemplary circuitry for the delay logic circuit 164 of FIG. 5 is shown. The delay logic circuit 164 generally comprises a plurality of gates 168a–168n and a plurality of delay circuits 170a–170n. The particular type of the plurality of gates 168a–168n may be modified in order to meet the criteria of a particular implementation. The plurality of delay circuits 170a–170n may be implemented as resistors, resistively-configured pass gate transistors, diode-configured transistors, non-inverting buffers, or any other conventional delay circuit in order to meet the criteria of a particular implementation.

The plurality of delay circuits 170a–170n may present signals to the plurality of gates 168a and 168n in response to the signal CLOCK1, the signal STATE1, the signal STATE2', the signal STATE4, the signal STATE6', and the signal CLOCK2. The plurality of gates 168a–168n may present the signal PD1, the signal PD2, the signal ND1 and the signal ND2 in response to the plurality of delay circuits 170a–170n and/or the signal STATE1, the signal STATE2', the signal STATE3, the signal STATE4, the signal STATE5, and the signal STATE6'.

The delay logic circuit 164 may delay the signal PD1, and/or the signal PD2, and/or the signal ND1, and/or the signal ND2 for a delay time t. The delay time t may be intended to match the delay time through the state machine logic circuit 110 to provide the corresponding signal ND1 or ND2.

Referring to FIG. 7, an exemplary circuit for the driver logic 166 of FIG. 5 is shown. The driver logic circuit 166 may comprise a driver 172, a driver 174, a driver 176 and a driver 178. In one example, the drivers 172, 174, 176 and 178 may be implemented as non-synthesizable output drivers. However, other driver types may be implemented in order to meet the criteria of a particular implementation. The non-synthesizable output drivers 172, 174, 176 and 178 may be configured to provide a three-statable output. The three-statable output may be the signal CLKOUT. Thus, the logic 110 may be implemented as a parallel tristate driver to minimize insertion delay.

Figure 8:
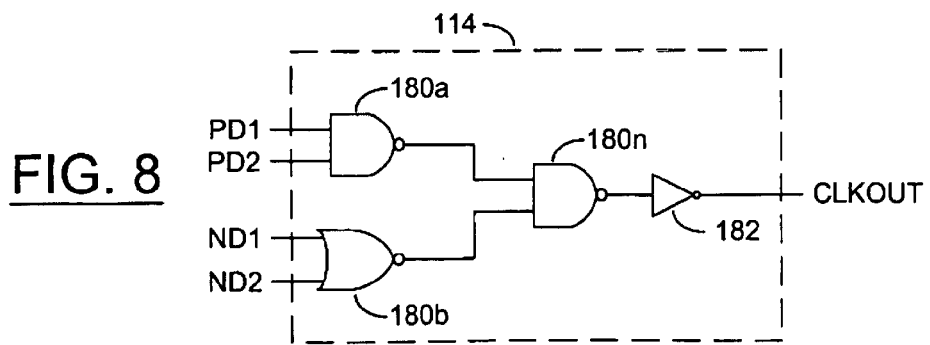
FIG. 8 illustrates an exemplary circuitry suitable for the synthesis logic 114 of FIG. 3.

Referring to FIG. 8, the optional synthesis logic 114 is shown in accordance with the present invention. To make the state machine logic 110 synthesizable, additional logic circuitry may be provided, such as the synthesis logic 114 shown in FIG. 8. The synthesis logic 114 may replace the driver logic circuit 166 shown in FIG. 7 of the state machine logic 110. The synthesis logic 114 may be coupled to the state machine logic 110 and may receive the signal PD1, the signal PD2, the signal ND1 and the signal ND2.

The synthesis logic 114 may comprise a plurality of gates 180a–180n and an inverter 182. The particular type of the plurality of gates 180a–180n may be modified in order to meet the criteria of a particular implementation. The inverter 182 may be coupled between the plurality of gates 180a–180n and the output 150. The synthesis logic 114 may provide the signal CLKOUT at the output 150 in response to the signal PD1, the signal PD2, the signal ND1 and the signal ND2.

Figure 9:
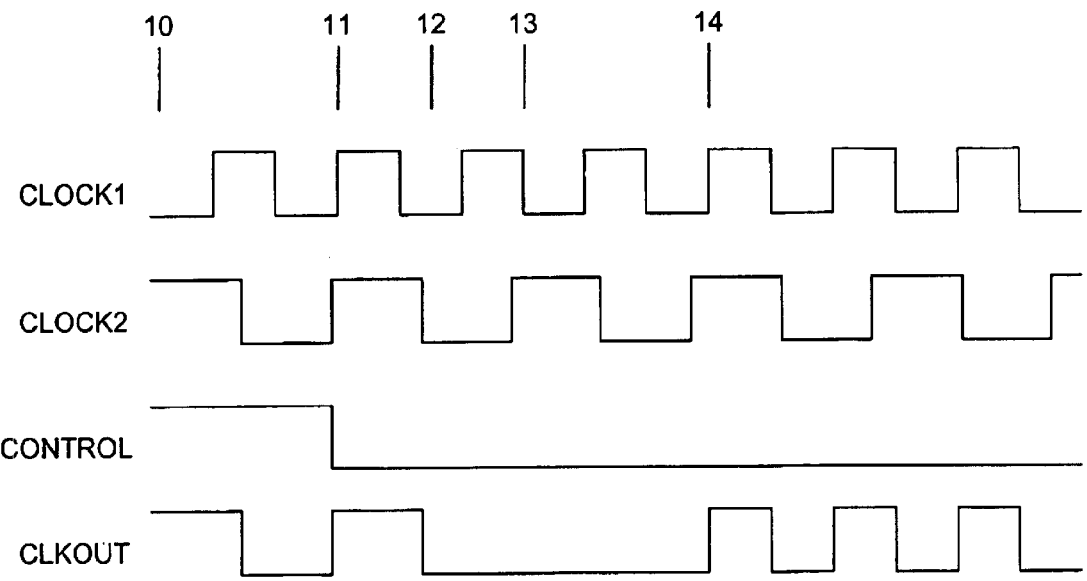
FIG. 9 is a timing diagram that illustrates the operation of the present invention.

Referring to FIG. 9, a timing diagram is shown. The timing diagram illustrates the operation of the circuit 100 and shows the relationship of the signal CLOCK1, the signal CLOCK2, the signal CONTROL and the signal CLKOUT. At a time t0, the circuit 100 receives the signal CLOCK1 and the signal CLOCK2. When in a particular (or first) logic state (e.g., HIGH), the signal CONTROL selects a first clock (e.g., CLOCK2) to drive the signal CLKOUT. At a time t1, the logic state of the signal CONTROL changes (e.g., to a LOW). Thereafter, the state machine logic 110 may be configured to:

A) allow the first clock signal CLOCK2 (through a corresponding signal, the signal CNTCLK2/1) to continue to drive the signal CLKOUT until a time t2 when the first clock signal CLOCK2 transitions to, or is in, a predetermined logic state (e.g., LOW);

B) hold the signal CLKOUT in the predetermined logic state until the second clock (e.g., Clock1) also is in, or transitions to, the predetermined logic state (e.g., at time t3);

C) drive the signal CLKOUT from the control/clock1 synthesizers 102 and the control/clock2 synthesizer 108 at the predetermined logic state for a predetermined period of time (preferably at least one clock cycle); then D) disable the first clock signal CLOCK2 from driving the signal CLKOUT (e.g., at time t4; alternatively, enable only the second clock signal CLOCK1 to drive the signal CLKOUT).

At a time t3, when the second clock signal CLOCK1 reaches the same predetermined logic state the first clock signal CLOCK2 is in, the output adds (or further includes) the other clock signal CLOCK2 or CLOCK1. "Overlapping" of the clock signals CLOCK2 and CLOCK1 in a particular output state for a predetermined period of time may prevent glitches. By this technique, the present invention ensures the safe synchronization of all control and clock domains with each other. A further alternative would be to hold the state machine logic 110 in the high state (e.g., logic 1) to overlap for a cycle to prevent a glitch during switching.

It is not necessary that the signal CONTROL transitions (e.g., changes logic states) at the same time that one or more clock signals CLOCK1 and/or CLOCK2 transition. If the signal CONTROL transitions at any time while the selected clock signal CLOCK1 or CLOCK2 is in a non-predetermined logic state, the signal CLKOUT is the same as the selected clock signal CLOCK1 or CLOCK2 until the selected clock signal CLOCK1 or CLOCK2 transitions to the predetermined logic state. At such time the signal CLKOUT is held at the predetermined logic state for a predetermined period of time (preferably at least one clock cycle). If the signal CONTROL transitions while the selected clock signal CLOCK1 or CLOCK2 is in the predetermined logic state, the signal CLKOUT continues to be controlled or driven by the first clock signal CLOCK2 for an independently predetermined period of time (preferably until the selected clock signal CLOCK2 transitions back to the predetermined logic state; typically, for two transitions of the selected clock signal CLOCK2). If, however, the signal CONTROL transitions while the selected clock signal CLOCK2 is transitioning between logic states, the state machine logic 110 may be configured to present the selected clock signal CLOCK2 as the signal CLKOUT until the selected clock signal CLOCK2 transitions to, or is in, the predetermined logic state.

The period of time during which the output is held in the predetermined logic state (or driven by both clock signals CLOCK1 and CLOCK2 while in both clock signals CLOCK1 and CLOCK2 are in the predetermined logic state) may be at least one cycle of either (a) the active or selected clock signal CLOCK1 or CLOCK2 or (b) the slowest of the clock signals CLOCK1 or CLOCK2 input into the particular synchronizer 102, 104, 106 and/or 108, depending on the construction of the synchronizer 102, 104, 106 and/or 108.

Figure 10:
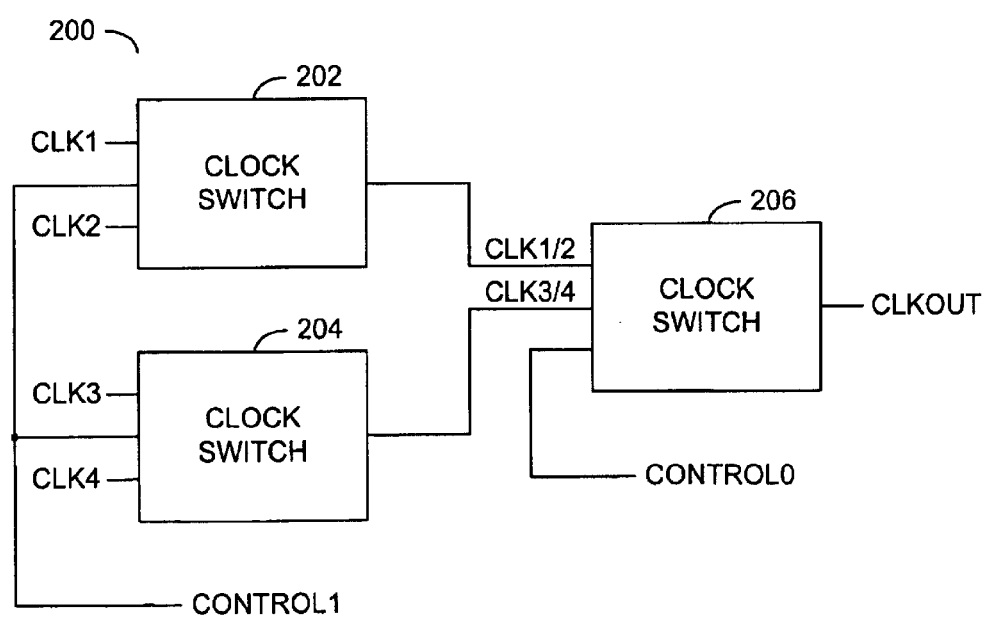
FIG. 10 illustrates an embodiment of an extension of the present switching scheme to encompass additional clock domains.

A further, more complex embodiment of the present switching scheme is shown in circuit 200 of FIG. 10. The circuit 200 may allow selection from up to four clock signals (e.g., CK1, CK2, CK3 and CK4). The circuit 200 may comprise a clock switch 202, a clock switch 204 and a clock switch 206. The clock switches 202, 204 and 206 may be independently represented by the present clock switch (e.g., circuit 100 of FIG. 3).

The clock switch 202 may present a clock control signal (e.g., CL1/2) in response to the signal CK1, the signal CK2 and a control signal (e.g., CONTROL1). The clock switch 204 may present a clock control signal (e.g., CL3/4) in response to the signal CK3, the signal CK3 and the signal CONTROL1. The clock switch 206 may present an output signal (e.g., CLKOUT) in response to the signal CK1/2, the signal CK3/4 and a control signal (e.g., CONTROL0).

The signal CONTROL1 and/or the signal CONTROL0 may be the same or complementary, or may even be replaced with the signal CK1 the signal CK2, the signal CK3, the signal CK4, the signal CK1/2 and the signal CK3/4. If one wishes to select from three input clocks, one may (i) omit one of the two clock switches 202 or 204, (ii) input one of the signals CK1, CK2, CK3 and/or CK4 directly into the clock switch 206, (iii) input either the signal CK1/2 or 20 the signal CK3/4 into the clock switch 206, and/or (iv) input the signal CONTROL0 into the clock switch 206.

Simultaneous switching from one clock domain to another may cause a glitch on the signal CLKOUT. Problems that may arise from such glitches may be prevented by ensuring that the clock signals CLOCK1 and CLOCK2 overlap in a particular logic state (e.g., LOW or HIGH, a digital "1" or "0", etc.). The logic state may preferably be a low logic state and/or a length of time sufficient to prevent clock-induced glitches in one or more circuits downstream from the circuit 100. This technique may be considered a "make before break" commutation in the parlance of the telephony arts.

While the invention has been particularly shown and described with reference to the preferred embodiments thereof, it will be understood by those skilled in the art that various changes in form and details may be made without departing from the spirit and scope of the invention.

What is claimed is:

1. A switch for at least two clock domains, comprising:
   a) first and second synchronizers in a first clock domain,
   b) third and fourth synchronizers in a second clock domain, and
   c) a state machine configured to interface with said synchronizers and (i) drive an output of said switch by said first clock domain in response to a first state of a first control signal, (ii) drive said output at a first predetermined logic level for not less than two cycles in said second clock domain in response to a second state of said first control signal and thereafter (iii) drive said output by said second clock domain.

2. The switch of claim 1, wherein each of the first and second clock domains are asynchronous clock domains with respect to each other.

3. The switch of claim 1, wherein the first and third synchronizers are configured to synchronize said first control signal to the first and second clock domains, respectively.

4. The switch of claim 1, wherein the state machine is configured to:
   a) receive a synchronizer output from each of said synchronizers, and
   b) provide said output of said switch in response to said synchronizer outputs.

5. The switch according to claim 1, wherein said state machine defines a plurality of transitions among a plurality of states in response to both a plurality of input signals and a current state of said states to control said output of said switch.

6. The switch of claim 1, wherein:
   said second synchronizer is configured to generate (i) a first signal received by said fourth synchronizer and (ii) a second signal received by said state machine; and
   said third synchronizer is configured to generate (i) a third signal received by said first synchronizer and (ii) a fourth signal received by said state machine.

7. The switch of claim 1, wherein said state machine comprises:
   delay logic configured to (i) receive a first clock signal from said first clock domain, a second clock signal from said second clock domain, and at least one output from each of said first, second, third and fourth synchronizers, and (ii) generate a plurality of output driver signals; and
   output driver logic configured to (i) receive said plurality of output driver signals, and (ii) generate said output of said switch.

8. The switch of claim 7, wherein said delay logic comprises:
 a plurality of delay circuits configured to (i) receive said first clock signal, said second clock signal, and at least one output from each of said first and fourth synchronizers, and (ii) generate first and second output driver signals; and
 a plurality of logic gates configured to (i) receive said first clock signal, said second clock signal, and at least one output from each of said second and third synchronizers, and (ii) generate third and fourth output driver signals.

9. The switch of claim 8, wherein said output driver logic comprises first, second, third and fourth output drivers, respectively receiving said first, second, third and fourth output driver signals.

10. The switch of claim 7, wherein said output driver logic comprises a plurality of nonsynthesizable output drivers.

11. The switch of claim 10, wherein said plurality of nonsynthesizable output drivers are three-statable.

12. The switch of claim 8, wherein said plurality of delay circuits comprise:
 a first delay circuit receiving said first clock signal,
 a second delay circuit receiving said second clock signal,
 a third delay circuit receiving an output from said first synchronizer,
 a fourth delay circuit receiving an output from said fourth synchronizer,
 a first gate (i) receiving outputs from said first and third delay circuits and (ii) generating said first output driver signal, and
 a second gate (i) receiving outputs from said second and fourth delay circuits and (ii) generating said second output driver signal.

13. The switch of claim 8, wherein said plurality of delay circuits are configured to match a delay time through said plurality of logic gates.

14. The switch of claim 8, wherein said first and second output driver signals control a first transition of said output of said switch, and said third and fourth output driver signals control a second transition of said output of said switch, said first and second transitions being complementary.

15. A method of switching between first and second clock domains, comprising:
 a) driving a switch output at a logic level controlled by a first clock domain in response to a first state of a first control signal;
 b) driving the switch output at a first predetermined logic level for not less than two cycles of said second clock domain in response to both (i) a second state of said first control signal and (ii) a current state of a state machine; and thereafter
 c) driving the switch output by said second clock domain.

16. The method of claim 15, wherein step b) comprises the sequential steps of (i) detecting a change in said state of said first control signal, (ii) driving the switch output at the first predetermined logic level in response to a predetermined transition of the first clock domain, and (iii) further driving the switch output at the first predetermined logic level in response to a predetermined transition of the second clock domain.

17. The method of claim 15, further comprising enabling the first clock domain to drive the switch output when the first clock domain transitions to the first predetermined logic level.

18. The method of claim 15, wherein the first and second clock domains are asynchronous with respect to each other.

19. The method of claim 15, further comprising tristating a first driver while driving said switch output from said second clock domain.

20. The method according to claim 15, wherein said state machine defines a plurality of transitions among a plurality of states in response to both a plurality of input signals and said current state of said states to control said switch output.

21. A switch for at least two clock domains, comprising:
 a first synchronizer comprising (i) a first flip-flop receiving a first clock signal from a first clock domain and a first control signal, and (ii) a second flip-flop receiving an inverted first clock signal and an output from said first flip-flop;
 a second synchronizer comprising (i) a third flip-flop receiving a second clock signal from a second clock domain and said first control signal, and (ii) a fourth flip-flop receiving an inverted second clock signal and an output from said third flip-flop;
 a third synchronizer comprising (i) a fifth flip-flop receiving said first clock signal and a second control signal from said second synchronizer, and (ii) a sixth flip-flop receiving an inverted first clock signal and an output from said fifth flip-flop;
 a fourth synchronizer comprising (i) a seventh flip-flop receiving said second clock signal and a third control signal from said first synchronizer, and (ii) an eighth flip-flop receiving an inverted second clock signal and an output from said seventh flip-flop; and
 a state machine configured to (i) receive said first and second clock signals and outputs from each of said first, second, third and fourth synchronizers, (ii) drive an output of said switch from at least one of the first and second clock domains, and (iii) arbitrate between the first and second clock domains for control of the switch output.

22. The switch of claim 21, wherein said state machine comprises:
 a ninth flip-flop receiving said first clock signal and a fourth control signal from said third synchronizer,
 a tenth flip-flop receiving said second clock signal and a fifth control signal from said fourth synchronizer,
 delay logic configured to (i) receive said first and second clock signals and said fourth and fifth control signals, and (ii) generate a plurality of output driver signals; and
 driver logic configured to (i) receive said plurality of output driver signals, and (ii) generate said switch output.

* * * * *